(12) United States Patent
Zhan et al.

(10) Patent No.: US 11,376,918 B2
(45) Date of Patent: Jul. 5, 2022

(54) ADJUSTMENT DEVICE, ADJUSTOR AND SHOCK ABSORBER

(71) Applicant: T-MAX (HANGZHOU) TECHNOLOGY CO., LTD., Hangzhou (CN)

(72) Inventors: Yongyong Zhan, Hangzhou (CN); Songfeng Wang, Hangzhou (CN); Xinfa Du, Hangzhou (CN); Yiming Wang, Hangzhou (CN); Hongliang Xu, Hangzhou (CN); Tao He, Hangzhou (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 275 days.

(21) Appl. No.: 16/814,699

(22) Filed: Mar. 10, 2020

(65) Prior Publication Data
US 2020/0290424 A1 Sep. 17, 2020

(30) Foreign Application Priority Data

Mar. 11, 2019 (CN) .......................... 201910180966.0
Mar. 11, 2019 (CN) .......................... 201910180983.4
(Continued)

(51) Int. Cl.
*F16F 9/34* (2006.01)
*B60G 17/08* (2006.01)
(Continued)

(52) U.S. Cl.
CPC ............. *B60G 17/08* (2013.01); *B60G 13/08* (2013.01); *F16F 9/065* (2013.01); *F16F 9/348* (2013.01);
(Continued)

(58) Field of Classification Search
CPC ..... B60G 17/08; F16F 9/06; F16F 9/34; F16F 9/50; F16K 5/04
(Continued)

(56) References Cited

U.S. PATENT DOCUMENTS

| 7,591 A | 8/1850 | Burdett |
| 634,385 A | 10/1899 | Wolfe et al. |

(Continued)

FOREIGN PATENT DOCUMENTS

| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 dated May 10, 2016.
(Continued)

*Primary Examiner* — Christopher P Schwartz
(74) *Attorney, Agent, or Firm* — Perkins Coie LLP

(57) ABSTRACT

An adjustment device includes a body, an adjustment inner gear ring, and an adjustment shaft. The body has a cavity therein, has a first end provided with a first hole and a second hole, and has a peripheral wall provided with a third hole. The first hole, the second hole, and the third hole are connected with the cavity. The adjustment inner gear ring is fitted in the cavity, and has a peripheral wall provided with adjustment holes. The adjustment holes have different cross-sectional areas. A second end of the adjustment shaft has an adjustment gear and passes through the second hole into the cavity. The adjustment gear meshes with the adjustment inner gear ring. The adjustment shaft is rotatable to drive (Continued)

rotation of the adjustment inner gear ring so as to enable the third hole to be connected with the cavity through one of the adjustment holes.

20 Claims, 13 Drawing Sheets

(30) Foreign Application Priority Data

| Mar. 11, 2019 | (CN) | .......................... 201910180984.9 |
|---|---|---|
| Mar. 11, 2019 | (CN) | .......................... 201920304957.3 |
| Mar. 11, 2019 | (CN) | .......................... 201920306364.0 |
| Mar. 11, 2019 | (CN) | .......................... 201920306365.5 |

(51) Int. Cl.

| F16H 1/06 | (2006.01) |
|---|---|
| F16F 9/348 | (2006.01) |
| B60G 13/08 | (2006.01) |
| F16F 9/44 | (2006.01) |
| F16K 3/08 | (2006.01) |
| F16K 3/02 | (2006.01) |
| F16F 9/06 | (2006.01) |

(52) U.S. Cl.
CPC ................. *F16F 9/44* (2013.01); *F16H 1/06* (2013.01); *F16K 3/029* (2013.01); *F16K 3/08* (2013.01); *B60G 2202/24* (2013.01); *B60G 2206/41* (2013.01); *B60G 2500/11* (2013.01); *B60G 2600/20* (2013.01); *B60G 2800/162* (2013.01); *F16F 2222/12* (2013.01); *F16F 2228/066* (2013.01); *F16F 2230/186* (2013.01)

(58) Field of Classification Search
USPC ........ 188/129, 130, 266.3, 266.4; 280/5.515, 280/276, 279
See application file for complete search history.

(56) References Cited

U.S. PATENT DOCUMENTS

| 724,155 | A | 3/1903 | Besse |
|---|---|---|---|
| 752,031 | A | 2/1904 | Chadwick |
| 817,224 | A | 4/1906 | Clifford |
| 955,658 | A | 4/1910 | Mitchell et al. |
| 1,063,643 | A | 6/1913 | Blake et al. |
| 1,169,140 | A | 1/1916 | Fassett et al. |
| 1,176,538 | A | 3/1916 | Warner |
| 1,182,169 | A | 5/1916 | Hansen |
| 1,222,127 | A | 4/1917 | Perri |
| 1,239,892 | A | 9/1917 | Dunderdale |
| 1,242,828 | A | 10/1917 | Lyle |
| 1,250,604 | A | 12/1917 | Lorenc |
| 1,268,335 | A | 6/1918 | Fairchild |
| 1,364,697 | A | 1/1921 | Branch |
| 1,437,648 | A | 12/1922 | Gore |
| 1,449,031 | A | 3/1923 | Blake |
| 1,471,972 | A | 10/1923 | Miller |
| 1,621,479 | A | 3/1927 | Cleveland et al. |
| 1,755,942 | A | 4/1930 | Woolson |
| 1,800,162 | A | 4/1931 | Stroud |
| 2,029,745 | A | 2/1936 | Stiner |
| 2,041,640 | A | 5/1936 | Goss |
| 2,118,557 | A | 5/1938 | Hamilton |
| 2,122,040 | A | 6/1938 | Machovec |
| 2,125,085 | A | 7/1938 | Pool |
| 2,197,266 | A | 4/1940 | Fredell |
| 2,209,576 | A | 7/1940 | McDonald |
| 2,246,986 | A | 6/1941 | Pellegrini |
| 2,436,961 | A | 3/1948 | Gabriel |
| 2,487,921 | A | 11/1949 | Culver |
| 2,492,068 | A | 12/1949 | Schofield et al. |
| 2,566,401 | A | 9/1951 | Bustin |
| 2,575,615 | A | 11/1951 | Crump |
| 2,583,894 | A | 1/1952 | Shuck |
| 2,645,504 | A | 7/1953 | Branstrator et al. |
| 2,669,613 | A | 2/1954 | Despard |
| 2,678,832 | A | 5/1954 | Wright |
| 2,682,671 | A | 7/1954 | Faure |
| 2,764,422 | A | 9/1956 | McDonald |
| 2,774,494 | A | 12/1956 | Malmström |
| 2,825,582 | A | 3/1958 | McDonald |
| 2,921,643 | A | 1/1960 | Vanderveld |
| 2,925,876 | A | 2/1960 | Wagner |
| 2,998,265 | A | 8/1961 | Kozicki |
| 3,008,533 | A | 11/1961 | Haberle |
| 3,012,633 | A | 12/1961 | Magee |
| 3,039,562 | A | 6/1962 | Wagner |
| 3,095,216 | A | 6/1963 | Browne et al. |
| 3,164,394 | A | 1/1965 | Husko |
| 3,172,499 | A | 3/1965 | Stairs |
| 3,266,594 | A | 8/1966 | Antosh et al. |
| 3,329,443 | A | 7/1967 | Lowder et al. |
| 3,392,990 | A | 7/1968 | Wolf |
| 3,488,066 | A | 1/1970 | Hansen |
| 3,494,634 | A | 2/1970 | De Paula |
| 3,515,406 | A | 6/1970 | Endsley |
| 3,517,942 | A | 6/1970 | Cuffe et al. |
| 3,522,396 | A | 7/1970 | Norden |
| 3,528,574 | A | 9/1970 | Denner et al. |
| 3,572,754 | A | 3/1971 | Fowler |
| 3,608,957 | A | 9/1971 | Maneck |
| 3,650,423 | A | 3/1972 | O'Brien |
| 3,671,058 | A | 6/1972 | Kent |
| 3,745,595 | A | 7/1973 | Nagy |
| 3,756,622 | A | 9/1973 | Pyle et al. |
| 3,762,742 | A | 10/1973 | Bucklen |
| 3,784,227 | A | 1/1974 | Rogge |
| 3,799,288 | A | 3/1974 | Manuel |
| 3,807,757 | A | 4/1974 | Carpenter et al. |
| 3,833,240 | A | 9/1974 | Weiler |
| 3,853,369 | A | 12/1974 | Holden |
| 3,863,890 | A | 2/1975 | Ruffing |
| 3,865,399 | A | 2/1975 | Way |
| 3,869,022 | A | 3/1975 | Wallk |
| 3,869,169 | A | 3/1975 | Johnson et al. |
| 3,887,217 | A | 6/1975 | Thomas |
| 3,889,997 | A | 6/1975 | Schoneck |
| 3,891,261 | A | 6/1975 | Finneman |
| 3,913,497 | A | 10/1975 | Maroshick |
| 3,915,475 | A | 10/1975 | Casella et al. |
| 3,957,284 | A | 5/1976 | Wright |
| 3,961,809 | A | 6/1976 | Clugston |
| 3,980,319 | A | 9/1976 | Kirkpatrick |
| 3,981,515 | A | 9/1976 | Rosborough |
| 3,986,724 | A | 10/1976 | Rivinius |
| 3,997,211 | A | 12/1976 | Graves |
| 4,020,920 | A | 5/1977 | Abbott |
| 4,053,172 | A | 10/1977 | McClure |
| 4,058,228 | A | 11/1977 | Hall |
| 4,068,542 | A | 1/1978 | Brand et al. |
| 4,073,502 | A | 2/1978 | Frank et al. |
| 4,089,538 | A | 5/1978 | Eastridge |
| 4,098,346 | A | 7/1978 | Stanfill |
| 4,106,790 | A | 8/1978 | Weiler |
| 4,110,673 | A | 8/1978 | Nagy et al. |
| 4,116,457 | A | 9/1978 | Nerem et al. |
| 4,124,099 | A | 11/1978 | Dudynskyj |
| 4,145,066 | A | 3/1979 | Shearin |
| 4,164,292 | A | 8/1979 | Karkau |
| 4,168,764 | A | 9/1979 | Walters |
| 4,174,021 | A | 11/1979 | Barlock |
| 4,180,143 | A | 12/1979 | Clugston |
| 4,185,849 | A | 1/1980 | Jaeger |
| 4,188,889 | A | 2/1980 | Favrel |
| 4,194,754 | A | 3/1980 | Hightower |
| 4,205,862 | A | 6/1980 | Tarvin |
| 4,219,104 | A | 8/1980 | MacLeod |
| 4,231,583 | A | 11/1980 | Learn |
| 4,275,664 | A | 6/1981 | Reddy |
| 4,325,668 | A | 4/1982 | Julian et al. |

(56) References Cited

U.S. PATENT DOCUMENTS

| | | |
|---|---|---|
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinermen |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 | 12/2004 | Leitner |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |
| 7,111,859 B2 | 9/2006 | Kim et al. |
| 7,118,120 B2 | 10/2006 | Lee et al. |
| 7,163,221 B2 | 1/2007 | Leitner |
| 7,258,386 B2 | 8/2007 | Leitner |

(56) References Cited

U.S. PATENT DOCUMENTS

| | | |
|---|---|---|
| 7,287,771 B2 | 10/2007 | Lee et al. |
| 7,360,779 B2 | 4/2008 | Crandall |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,416,202 B2 | 8/2008 | Fichter |
| 7,487,986 B2 | 2/2009 | Leither et al. |
| 7,516,703 B2 | 4/2009 | Tazreiter |
| 7,566,064 B2 | 7/2009 | Leitner et al. |
| 7,584,975 B2 | 9/2009 | Leitner |
| 7,637,519 B2 | 12/2009 | Leitner et al. |
| 7,673,892 B2 | 3/2010 | Kuntze et al. |
| 7,717,444 B2 | 5/2010 | Fichter |
| 7,793,596 B2 | 9/2010 | Hirtenlehner |
| 7,823,896 B2 | 11/2010 | VanBelle |
| 7,874,565 B2 | 1/2011 | Duncan |
| D634,687 S | 3/2011 | Vukel |
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,818 B2 * | 10/2011 | Yamawaki ............. B60G 17/06 280/5.515 |
| 8,042,821 B2 | 10/2011 | Yang et al. |
| D649,100 S | 11/2011 | Cheng |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2 | 6/2013 | Yang et al. |
| 8,516,914 B2 * | 8/2013 | Osterlanger ........... B62D 17/00 188/266 |
| 8,602,431 B1 | 12/2013 | May |
| 8,641,052 B2 * | 2/2014 | Kondo .................. B60G 13/14 188/266.2 |
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B2 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,839 B2 | 11/2018 | Povinelli et al. |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1 | 8/2019 | Du et al. |
| 10,618,472 B2 | 4/2020 | Du |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano et al. |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0280242 A1 | 12/2005 | Fabiano et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2009/0250896 A1 | 10/2009 | Watson |
| 2009/0295114 A1 | 12/2009 | Yang et al. |
| 2010/0044993 A1 | 2/2010 | Watson |
| 2011/0115187 A1 | 5/2011 | Leitner et al. |
| 2011/0215550 A1 * | 9/2011 | Shirai .................... F16F 9/0209 280/276 |
| 2012/0025485 A1 | 2/2012 | Yang et al. |
| 2013/0154230 A1 | 6/2013 | Ziaylek |
| 2015/0097353 A1 | 4/2015 | Rasmussen et al. |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2017/0008459 A1 | 1/2017 | Leitner et al. |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2020/0023779 A1 | 1/2020 | Du et al. |

(56) References Cited

U.S. PATENT DOCUMENTS

| | | | |
|---|---|---|---|
| 2020/0023780 A1 | 1/2020 | Du et al. | |
| 2020/0047674 A1 | 2/2020 | Du et al. | |

FOREIGN PATENT DOCUMENTS

| | | | |
|---|---|---|---|
| CA | 2218280 A1 | 6/1999 | |
| CA | 2332193 A1 | 9/2001 | |
| CA | 2370618 A1 | 11/2007 | |
| CN | 2174368 Y | 8/1994 | |
| CN | 2806241 Y | 8/2006 | |
| CN | 1976833 A | 6/2007 | |
| CN | 101279594 A | 10/2008 | |
| CN | 202806579 U | 3/2013 | |
| CN | 103507719 A | 1/2014 | |
| CN | 203728468 U | 7/2014 | |
| CN | 104192070 A | 12/2014 | |
| CN | 2044474223 U | 7/2015 | |
| CN | 105083136 A | 11/2015 | |
| CN | 105083137 A | 11/2015 | |
| CN | 105128751 A | 12/2015 | |
| CN | 106122348 A * | 11/2016 | F16F 9/06 |
| CN | 106249641 A | 12/2016 | |
| CN | 106499293 A | 3/2017 | |
| CN | 108263303 A | 7/2018 | |
| CN | 108454518 A | 8/2018 | |
| CN | 108468739 A * | 8/2018 | F16F 9/06 |
| CN | 207758678 U | 8/2018 | |
| CN | 108583446 A | 9/2018 | |
| CN | 108791086 A | 11/2018 | |
| CN | 208037900 U | 11/2018 | |
| CN | 108973868 A | 12/2018 | |
| CN | 208232903 U | 12/2018 | |
| CN | 109253888 A | 1/2019 | |
| CN | 208325054 U | 1/2019 | |
| CN | 208344082 U | 1/2019 | |
| DE | 1042403 B | 10/1958 | |
| DE | 1220276 B | 6/1966 | |
| DE | 2555468 A1 | 6/1977 | |
| DE | 7922488 U1 | 7/1982 | |
| DE | 3151621 A1 | 7/1983 | |
| DE | 3932142 | 4/1990 | |
| DE | 8910933 U1 | 10/1990 | |
| EP | 0066493 | 12/1982 | |
| EP | 373842 A1 | 6/1990 | |
| EP | 0418615 A1 | 3/1991 | |
| EP | 0559624 | 8/1995 | |
| EP | 0966367 A1 | 9/1998 | |
| EP | 0901783 A2 | 3/1999 | |
| EP | 1116840 A2 | 7/2001 | |
| EP | 1213185 B1 | 12/2004 | |
| EP | 3002157 | 4/2016 | |
| EP | 3176038 B1 | 1/2019 | |
| EP | 3237254 B1 | 2/2019 | |
| FR | 1271901 A | 9/1961 | |
| FR | 1350593 A | 12/1963 | |
| FR | 2225612 A | 8/1974 | |
| FR | 2651739 A1 | 3/1991 | |
| FR | 2764254 A1 | 12/1998 | |
| GB | 191315077 A | 8/1913 | |
| GB | 254426 | 7/1926 | |
| GB | 340162 A | 12/1930 | |
| GB | 381672 | 10/1932 | |
| GB | 745918 | 3/1956 | |
| GB | 934387 | 8/1963 | |
| GB | 936846 | 9/1963 | |
| GB | 987846 A | 3/1965 | |
| GB | 1430813 A | 4/1976 | |
| GB | 1471256 A | 4/1977 | |
| GB | 2045699 A | 11/1980 | |
| GB | 2055705 A | 3/1981 | |
| GB | 2129378 | 5/1984 | |
| GB | 2201511 A | 9/1988 | |
| GB | 2288014 A | 10/1995 | |
| IN | 201741011829 | 10/2018 | |
| JP | 63-255144 A | 10/1988 | |
| JP | H04138944 A | 5/1992 | |
| JP | H04339040 A | 11/1992 | |
| JP | H04342629 A | 11/1992 | |
| JP | H05310061 A | 11/1993 | |
| JP | H05310081 A | 11/1993 | |
| JP | H08132967 A | 5/1996 | |
| JP | H10287182 A | 10/1998 | |
| JP | 2018-177089 A | 11/2018 | |
| JP | 2019-001222 A | 1/2019 | |
| KR | 2000-0003099 | 2/2000 | |
| MX | 2017001699 A | 8/2018 | |
| MX | 2017001700 A | 8/2018 | |
| MX | 2017006328 A | 8/2018 | |
| MX | 2017008032 A | 9/2018 | |
| MX | 2017010183 A | 9/2018 | |
| SU | 403594 | 11/1973 | |
| SU | 783097 A1 | 11/1980 | |
| WO | 1988/05759 A1 | 8/1988 | |
| WO | 1995/00359 A1 | 1/1995 | |
| WO | 1997/027139 A1 | 7/1997 | |
| WO | 1998/43856 A2 | 10/1998 | |
| WO | 2000/047449 A1 | 8/2000 | |
| WO | 2001/000441 A1 | 1/2001 | |
| WO | 2003/039910 A1 | 5/2003 | |
| WO | 2003/039920 A1 | 5/2003 | |
| WO | 2003/066380 A1 | 8/2003 | |
| WO | 2003/069294 A1 | 8/2003 | |
| WO | 2006/050297 A2 | 5/2006 | |
| WO | 2009/103163 A1 | 8/2009 | |
| WO | 2017/176226 A1 | 10/2017 | |
| WO | 2018/148643 A1 | 8/2018 | |
| WO | 2018/197393 A1 | 11/2018 | |
| WO | 2019/009131 A1 | 1/2019 | |
| WO | 2019/034493 A1 | 2/2019 | |

OTHER PUBLICATIONS

U.S. Office Action dated Nov. 18, 2019 for U.S. Appl. No. 16/510,775, filed Jul. 12, 2019. (9 pages).

U.S. Office Action dated Dec. 20, 2019 for U.S. Appl. No. 16/655,149, filed Oct. 16, 2019. (11 pages).

International Search Report of the International Searching Authority for PCT International Application No. PCT/CN2019/077842 dated Oct. 12, 2019. (English Translation, p. 1-20).

International Search Report and Written Opinion of the International Searching Authority for PCT International Application No. PCT/CN2019/082919 dated Oct. 11, 2019. (English Translation, p. 1-20).

International Search Report and Written Opinion of the International Searching Authority for PCT International Application No. PCT/CN2019/075535 dated Nov. 11, 2019. (English translation, p. 1-21).

U.S. Office Action dated Jun. 9, 2020 for U.S. Appl. No. 16/826,094, filed Mar. 20, 2020 (10 pages).

U.S. Office Action dated Jun. 9, 2020 for U.S. Appl. No. 15/931,474, filed May 13, 2020 (12 pages).

U.S. Notice of Allowance for U.S. Appl. No. 16/510,775 dated Feb. 3, 2020 (5 pages).

U.S. Notice of Allowance for U.S. Appl. No. 16/655,149 dated Feb. 20, 2020 (8 pages).

* cited by examiner

ADJUSTMENT DEVICE, ADJUSTOR AND SHOCK ABSORBER

CROSS-REFERENCE TO RELATED APPLICATIONS

This application claims priority to and benefits of Chinese Patent Application Serial No. 201910180984.9, filed with National Intellectual Property Administration of the People's Republic of China (PRC) on Mar. 11, 2019, Chinese Patent Application Serial No. 201920304957.3, filed with National Intellectual Property Administration of PRC on Mar. 11, 2019, Chinese Patent Application Serial No. 201910180966.0, filed with National Intellectual Property Administration of PRC on Mar. 11, 2019, Chinese Patent Application Serial No. 201920306364.0, filed with National Intellectual Property Administration of PRC on Mar. 11, 2019, Chinese Patent Application Serial No. 201910180983.4, filed with National Intellectual Property Administration of PRC on Mar. 11, 2019, and Chinese Patent Application Serial No. 201920306365.5, filed with National Intellectual Property Administration of PRC on Mar. 11, 2019, the entire contents of which are incorporated herein by reference.

TECHNICAL FIELD

The present disclosure relates to a field of shock absorption technology.

BACKGROUND

A vehicle shock absorber is used to reduce vibration of a vehicle frame and a vehicle body, and improve travelling stability and comfort of the vehicle. If the shock absorber is too soft, the vehicle body is prone to bounce up and down; if the shock absorber is too hard, large resistance may be caused and hinder a spring from working properly. Thus, in order to meet the needs of different vehicles, it is necessary to install shock absorbers with different hardnesses.

In the related art, in order to adapt to different needs, an adjustment device is provided to adjust the hardness of the shock absorber. However, the adjustment device in the related art has a narrow adjustment range and a poor adjustment effect, and hence the hardness of the shock absorber is unsatisfactorily adjusted.

SUMMARY

The present disclosure aims to solve one of the technical problems in the related art at least to some extent.

To this end, embodiments of an aspect of the present disclosure provide an adjustment device that can adjust the hardness of a shock absorber and has a wide adjustment range and an excellent adjustment effect.

Embodiments of another aspect of the present disclosure provide an adjustor.

Embodiments of still another aspect of the present disclosure provide a shock absorber.

The adjustment device according to embodiments of the first aspect of the present disclosure includes: a body having a cavity therein, and having a first end provided with a first hole and a second hole and a peripheral wall provided with a third hole, all of the first hole, the second hole, and the third hole being communicated with the cavity; an adjustment inner gear ring fitted in the cavity, and having a peripheral wall provided with a plurality of adjustment holes running through the peripheral wall, the plurality of adjustment holes being arranged along a circumferential direction of the adjustment inner gear ring and spaced apart from each other, and the plurality of adjustment holes having cross-sectional areas different from each other; and an adjustment shaft having a first end and a second end, the second end of the adjustment shaft having an adjustment gear and passing through the second hole into the cavity, the adjustment gear meshing with the adjustment inner gear ring, and the adjustment shaft being rotatable to drive rotation of the adjustment inner gear ring by the adjustment gear so as to enable the third hole to be communicated with the cavity through one of the plurality of adjustment holes.

In the adjustment device according to embodiments of the present disclosure, by configuring the cross-sectional areas of the plurality of adjustment holes of the adjustment inner gear ring to be different from each other, and by driving the adjustment inner gear ring to rotate by means of the adjustment gear to enable the third hole to be communicated with the cavity through one of the plurality of adjustment holes, the first hole is communicated with the third hole through the cavity and one of the plurality of adjustment holes. The flow rate of the oil which is allowed to pass through different adjustment holes is different, such that the adjustment for the hardness of the shock absorber can be realized. Moreover, since the adjustment inner gear ring has a relatively large diameter, more adjustment holes can be provided in the adjustment inner gear ring, and the cross-sectional areas of the adjustment holes can vary in a wider range, thereby resulting in a wider adjustment range and improving the adjustment effect.

The adjustor according to embodiments of another aspect of the present disclosure includes: a first cylinder body having a first inner cavity; a first piston movably provided in the first inner cavity; and an adjustment device provided at a first end of the first cylinder body and configured as the adjustment device described in the above embodiments.

The shock absorber according to embodiments of still another aspect of the present disclosure includes: a first cylinder body having a first inner cavity; a first piston movably provided in the first inner cavity; a second cylinder body having a second inner cavity; a second piston movably provided in the second inner cavity; an adjustment device configured as the adjustment device described in the above embodiments; and a connecting pipe communicated with the second inner cavity, and communicated with the first inner cavity by means of the adjustment device.

Figure 1:
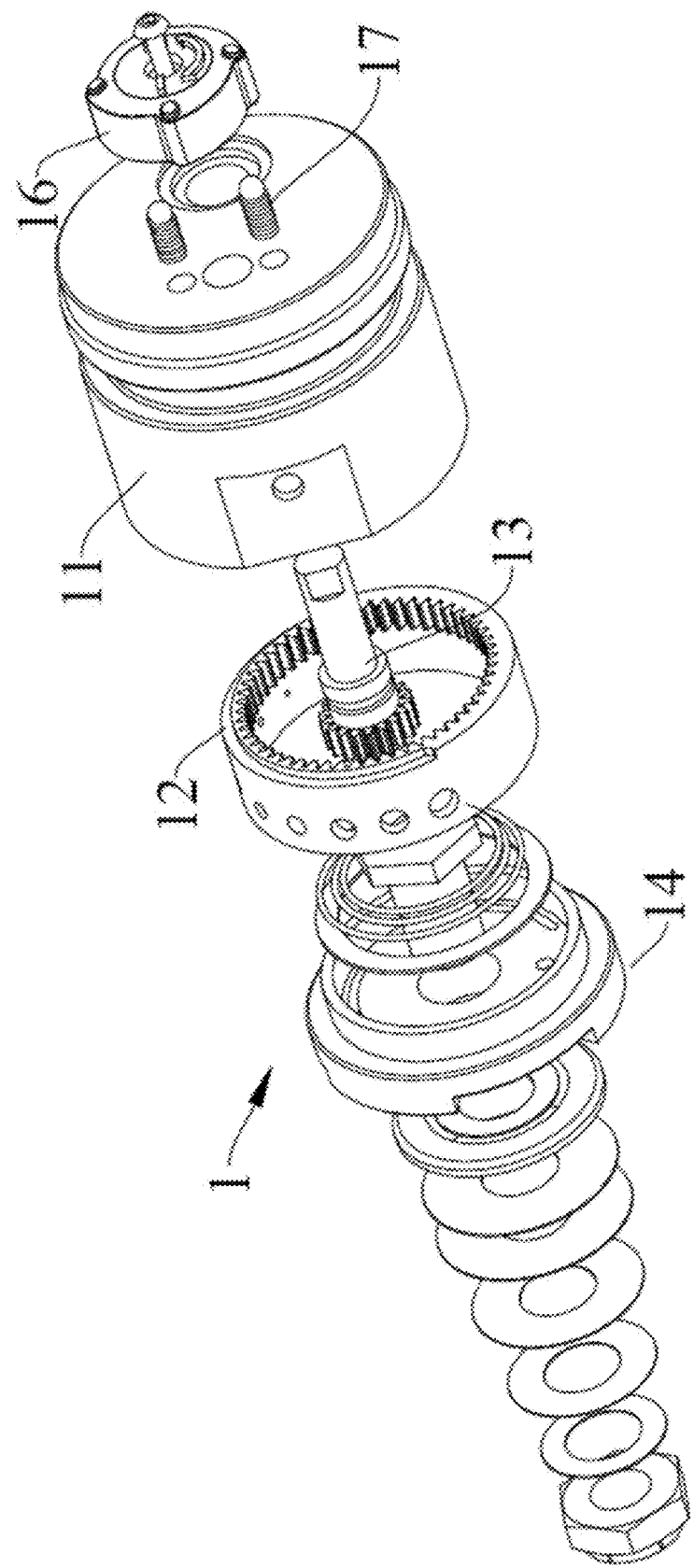
FIG. 1 is an exploded view of an adjustment device according to embodiments of the present disclosure.

Reference numerals include the following:
adjustment device 1, body 11, first end (solid section) 111 of body, second end (cylindrical section) 112 of body, boss 113, cavity 101, first end 1011 of cavity, second end 1012 of cavity, first hole 102, second hole 103, first hole segment 1031, second hole segment 1032, opening portion 10320, third hole 104, annular groove 105, counter bore 107, recess 108, adjustment inner gear ring 12, adjustment hole 120, limiting guide slot 121, adjustment shaft 13, first end 131 of adjustment shaft, second end 132 of adjustment shaft, adjustment gear 133, valve assembly 14, valve body 141, first end 1411 of valve body, second end 1412 of valve body, first valve opening 1413, second valve opening 1414, first valve sheet 142, second valve sheet 143, first elastic member 144, gasket 145, fastener 146, T-shaped bolt 1461, nut 1462, limiting member 15, knob 16, positioning assembly 17, second elastic member 171, positioning ball 172, first cylinder body 2, first inner cavity 21, first piston 3, connecting pipe 4, second cylinder body 5, second inner cavity 51, second piston 6.

DETAILED DESCRIPTION

Embodiments of the present disclosure will be described in detail and examples of the embodiments will be illustrated in the drawings. The embodiments described below with reference to the drawings are illustrative and used to generally understand the present disclosure. The embodiments shall not be construed to limit the present disclosure. In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position relationship as then described or as shown in the drawings under discussion. These relative terms are for convenience of description and do not indicate or imply that any feature of the present disclosure should have a particular orientation, or be constructed and operated in a particular orientation. Thus, these terms shall not be construed to limit the present disclosure.

A shock absorber according to embodiments of the present disclosure will be described with reference to the drawings.

As illustrated in FIGS. 13-16, the shock absorber according to embodiments of the present disclosure includes a first cylinder body 2, a first piston 3, a connecting pipe 4, a second cylinder body 5, a second piston 6, and an adjustment device 1. The first cylinder body 2 has a first inner cavity 21, and the first piston 3 is movably provided in the first inner cavity 21. The second cylinder body 5 has a second inner cavity 51, and the second piston 6 is movably provided in the second inner cavity 51. The connecting pipe 4 is in communication with the second inner cavity 51, and is communicated with the first inner cavity 21 through the adjustment device 1. In the description of the present disclosure, terms such as "first" and "second" are used herein for purposes of description and are not intended to indicate or imply relative importance or significance.

Figure 14:
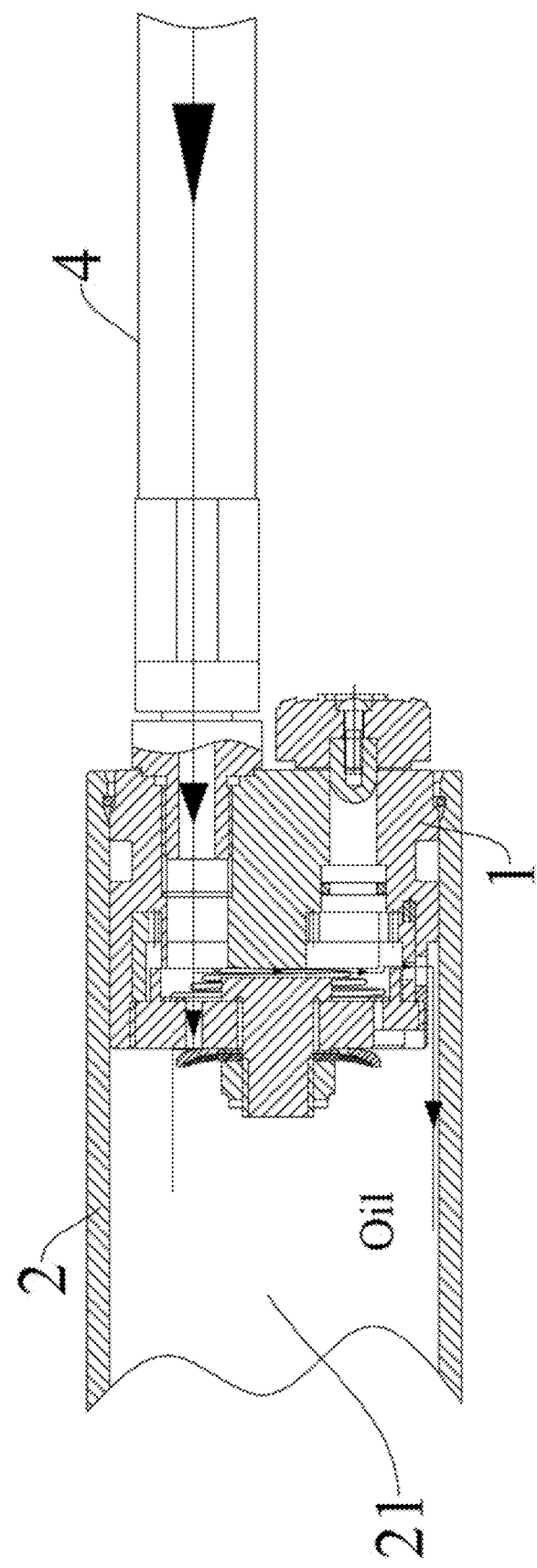
FIG. 14 is a partially enlarged view of FIG. 13.
Figure 15:
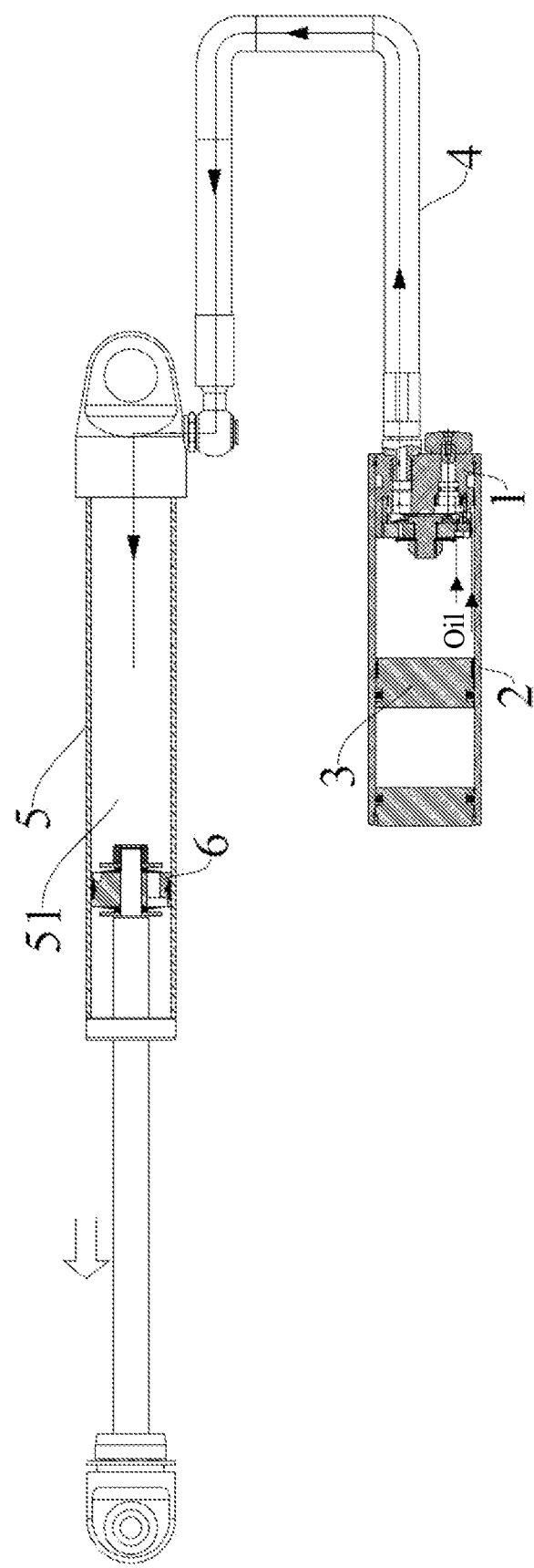
FIG. 15 is a schematic view of a shock absorber according to embodiments of the present disclosure, in which oil flows from a first inner cavity into a second inner cavity.

As illustrated in FIGS. 14 and 15, the adjustment device 1 is provided in a right end of the first inner cavity 21, and the connecting pipe 4 has a lower end communicated with the first inner cavity 21 through the adjustment device 1 and an upper end communicated with the second inner cavity 51.

The adjustment device according to embodiments of the present disclosure will be described with reference to the drawings.

Figure 2:
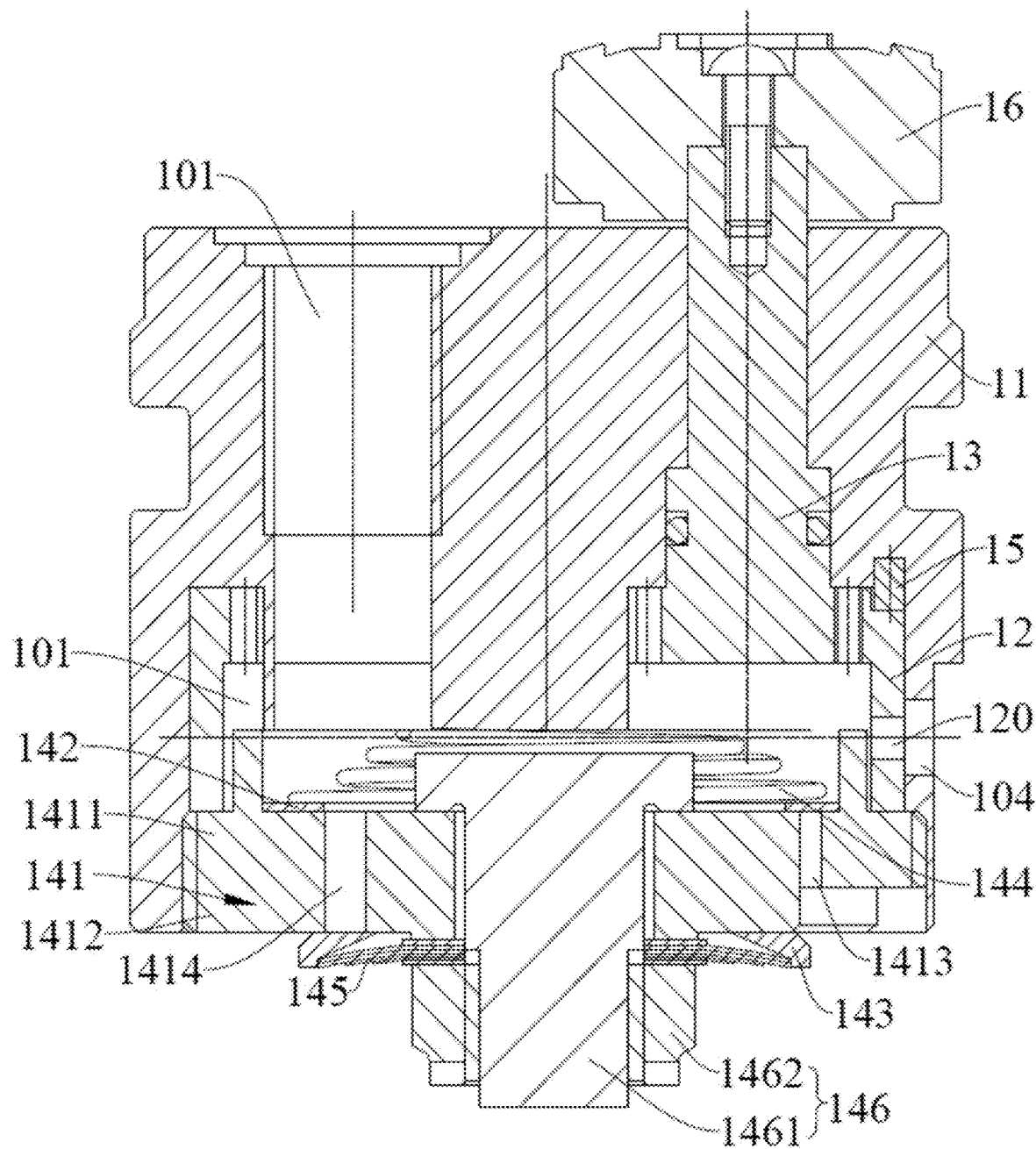
FIG. 2 is a sectional view of an adjustment device according to embodiments of the present disclosure, in which a position of a first hole is illustrated.
Figure 3:
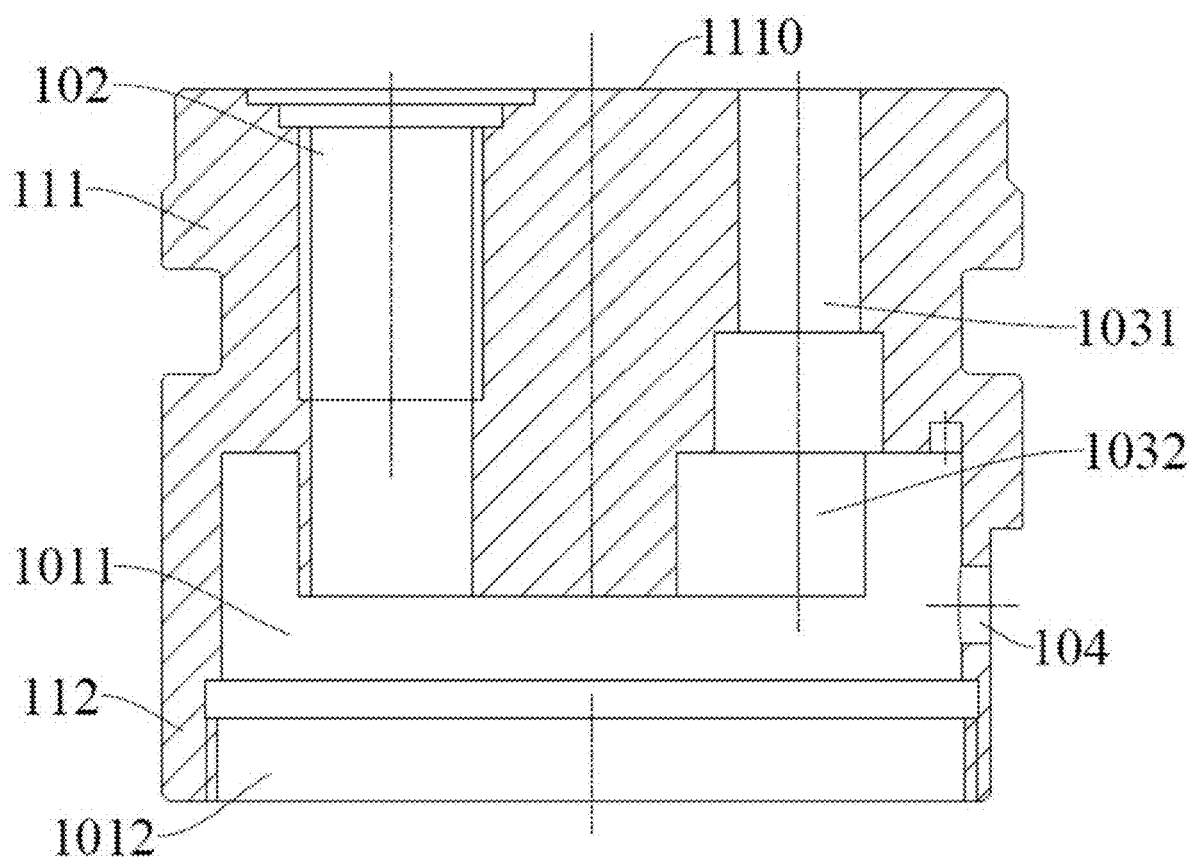
FIG. 3 is a sectional view of a body of an adjustment device according to embodiments of the present disclosure.

As illustrated in FIGS. 1-3, the adjustment device 1 according to embodiments of the present disclosure includes a body 11, an adjustment inner gear ring 12, and an adjustment shaft 13.

The body 11 has a cavity 101 therein, a first end 111 of the body 11 (an upper end of the body 11 as shown in FIG. 2) is provided with a first hole 102 and a second hole 103, and the first hole 102 is in communication with an inner cavity of the connecting pipe 4. A third hole 104 is provided in a peripheral wall of the body 11 and is communicated with the first inner cavity 21. The first hole 102, the second hole 103, and the third hole 104 are all communicated with the cavity 101. As illustrated in FIGS. 2 and 3, the cavity 101 is defined in a lower end of the body 11, the first hole 102 and the second hole 103 are provided in the upper end of the body 11, and both of a lower end of the first hole 102 and a lower end of the second hole 103 are communicated with the cavity 101. The third hole 104 is provided in a lower end of the peripheral wall of the body 11 and runs through the peripheral wall to make the third hole 104 communicated with the cavity 101.

Figure 7:
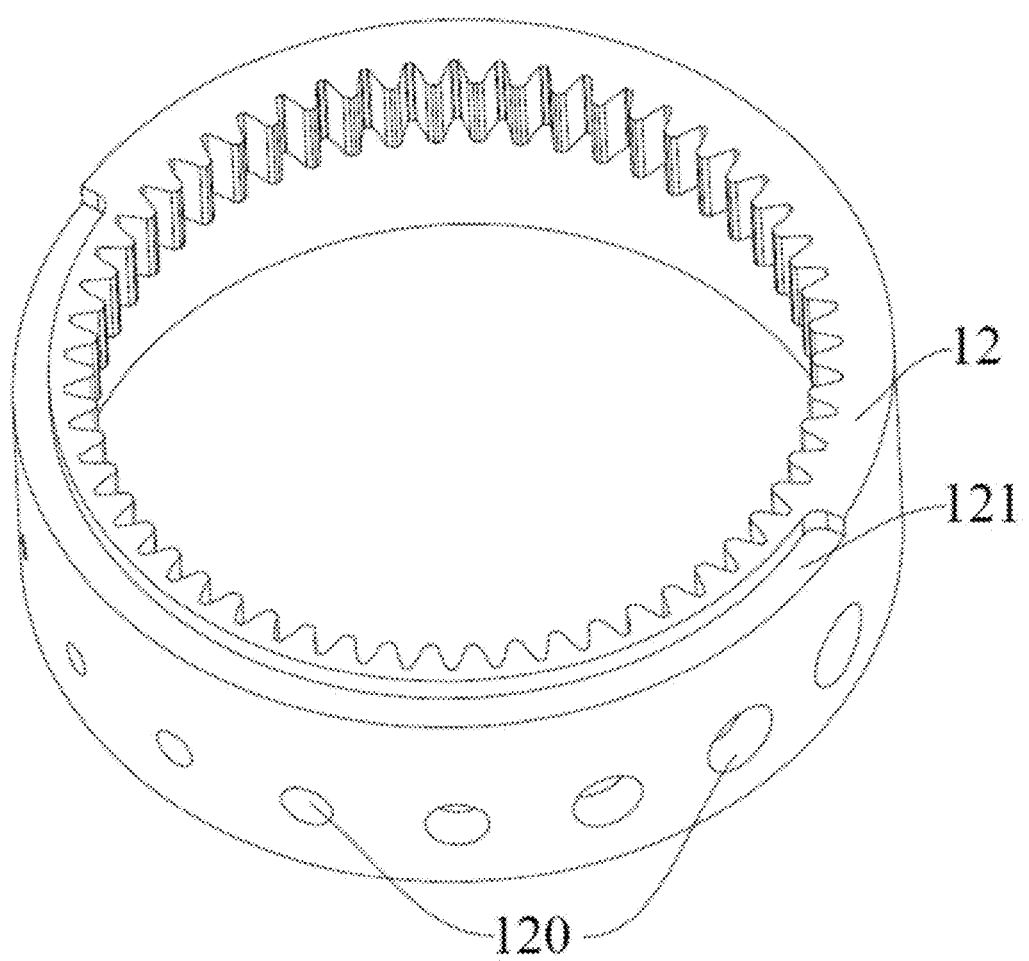
FIG. 7 is a schematic view of an adjustment inner gear ring of an adjustment device according to embodiments of the present disclosure.

As illustrated in FIGS. 2 and 7, the adjustment inner gear ring 12 is fitted in the cavity 101 and has a peripheral wall provided with a plurality of adjustment holes 120 running through this peripheral wall. The plurality of adjustment holes 120 are arranged along a circumferential direction of the adjustment inner gear ring 12 and spaced apart from each other, and the plurality of adjustment holes 120 have cross-sectional areas different from each other. In the description of the present disclosure, unless specified otherwise, the term "a plurality of" means at least two, such as two, three, etc.

Figure 8:
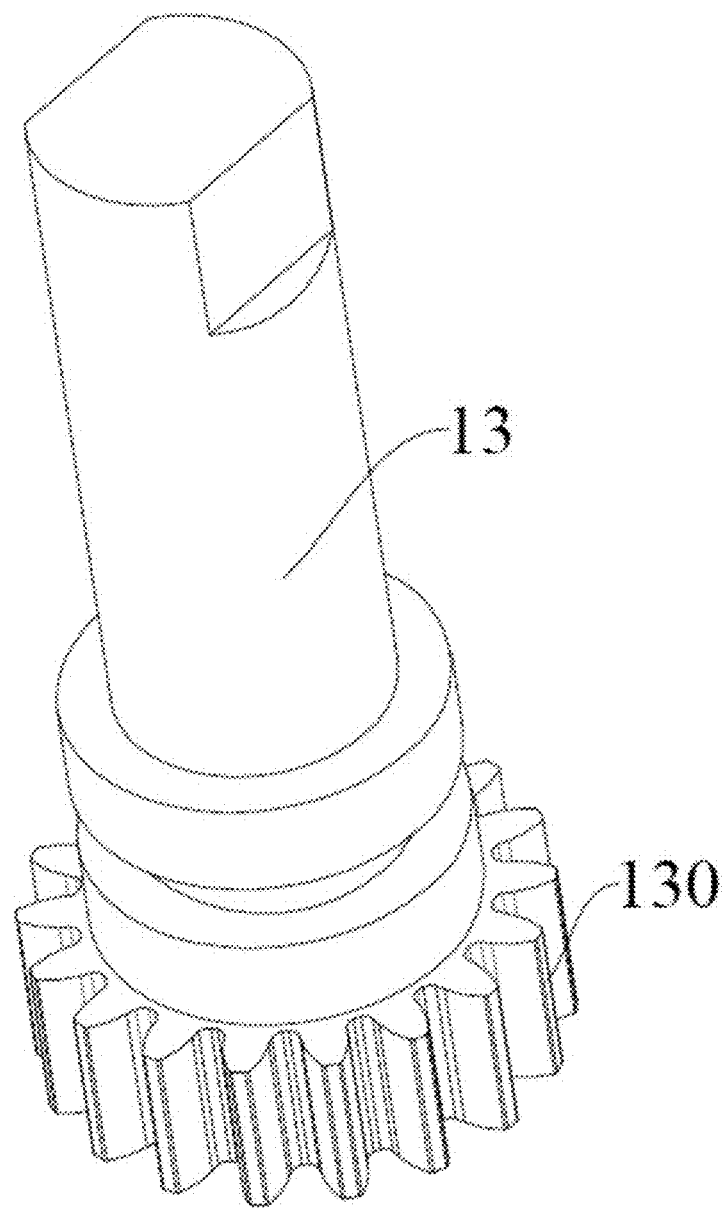
FIG. 8 is a schematic view of an adjustment shaft of an adjustment device according to embodiments of the present disclosure.

As illustrated in FIGS. 2, 3 and 8, the adjustment shaft 13 has a first end 131 and a second end 132. The second end 132 of the adjustment shaft 13 has an adjustment gear 133 and passes through the second hole 103 into the cavity 101. The adjustment gear 133 meshes with the adjustment inner gear ring 12. The adjustment shaft 13 is rotatable to drive rotation of the adjustment inner gear ring 12 by the adjustment gear 133, such that the third hole 104 is communicated with the cavity 101 through one of the plurality of adjustment holes 120.

In the adjustment device 1 according to embodiments of the present disclosure, the adjustment shaft 13 is rotatable about its axis to drive the adjustment inner gear ring 12 to rotate about an axis of the adjustment inner gear ring 12 by means of the adjustment gear 133. Through the rotation of the adjustment inner gear ring 12, any one of the plurality of adjustment holes 120 in the adjustment inner gear ring 12 can communicate the third hole 104 with the cavity 101, such that oil flowing into the cavity 101 through the connecting pipe 4 and the first hole 102 flows into the first inner cavity 21 through one of the plurality of adjustment holes 120 via the third hole 104, or oil in the first inner cavity 21 flows into the cavity 101 through the third hole 104 and one of the plurality of adjustment holes 120 and flows into the second inner cavity 51 through the first hole 102 and the connecting pipe 4. Moreover, since the cross-sectional areas of the plurality of adjustment holes 120 are different from each other, the flow rate of the oil entering the third hole 104 through different adjustment holes 120 is different.

In the adjustment device 1 according to embodiments of the present disclosure, by configuring the cross-sectional areas of the plurality of adjustment holes 120 of the adjustment inner gear ring 12 to be different from each other, and by configuring the adjustment shaft 13 to be rotatable to drive the rotation of the adjustment inner gear ring 12 by the adjustment gear 133 to enable the third hole 104 to be communicated with the cavity 101 through one of the plurality of adjustment holes 120, the first hole 102 is communicated with the third hole 104 through the cavity 101 and one of the plurality of adjustment holes 120. The flow rate of the oil which is allowed to pass through different adjustment holes 120 is different, and a compression force and a restoring force of the shock absorber can be adjusted by the different flow rates of the oil, thereby realizing the adjustment for the hardness of the shock absorber. Moreover, since the adjustment inner gear ring 12 has a relatively large diameter, more adjustment holes 120 can be provided in the adjustment inner gear ring 12, and the cross-sectional areas of the plurality of adjustment holes 120 can vary in a wider range, thereby resulting in a wider adjustment range and improving the adjustment effect.

In some specific embodiments, the cross-sectional areas of the plurality of adjustment holes 120 are gradually decreased along the circumferential direction of the adjustment inner gear ring 12. As illustrated in FIG. 7, the cross sections of the adjustment holes 120 are circular, and diameters of the plurality of adjustment holes 120 are gradually decreased along the circumferential direction of the adjustment inner gear ring 12.

In some embodiments, the cavity 101 has a first end 1011 (an upper end of the cavity 101 as shown in FIG. 3) and a second end 1012 (a lower end of the cavity 101 as shown in FIG. 3), and the second end 1012 of the cavity 101 is open.

The first hole 102 extends from a first end face 1110 of the body 11 (an upper end face of the body 11 as shown in FIG. 3) towards a second end 112 of the body 11 (a lower end of the body 11 as shown in FIG. 3) by a first predetermined length. As illustrated in FIG. 3, the first hole 102 extends downwardly from the upper end face of the body 11 by the first predetermined length. The second hole 103 extends from the first end face 1110 of the body 11 towards the second end 112 of the body 11 by a second predetermined length. As illustrated in FIG. 3, the second hole 103 extends downwardly from the upper end face of the body 11 by the second predetermined length.

Figure 4:
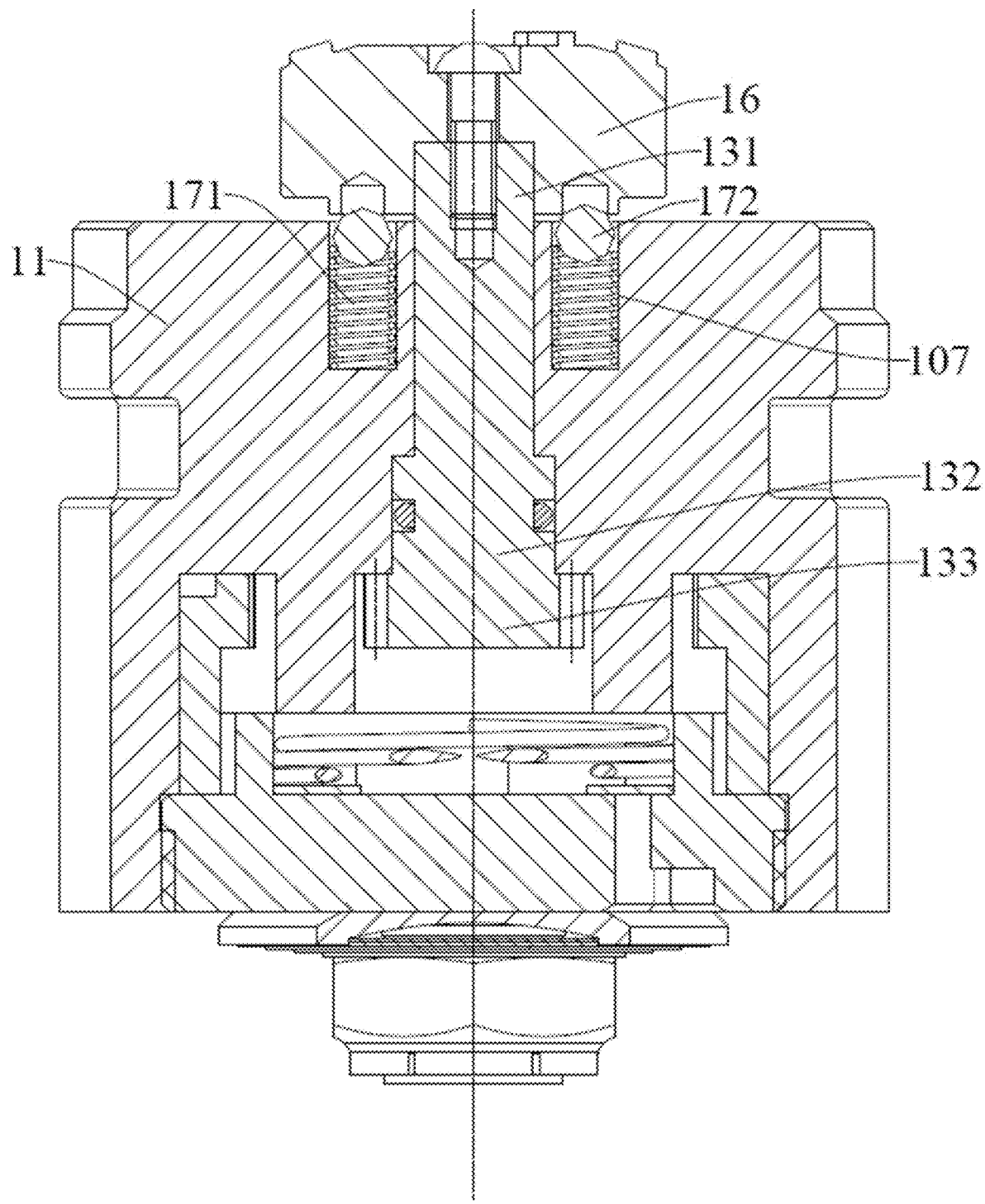
FIG. 4 is a sectional view of an adjustment device according to embodiments of the present disclosure, in which a position of a positioning assembly is illustrated.

The first end 131 of the adjustment shaft 13 (an upper end of the adjustment shaft 13 as shown in FIGS. 2-4) extends out of the second hole 103. As illustrated in FIGS. 2-3, the upper end of the adjustment shaft 13 extends out of the second hole 103, that is, an upper end face of the adjustment shaft 13 is located above the second hole 103.

In some embodiments, as illustrated in FIG. 2 and FIGS. 9-11, the adjustment device 1 further includes a valve assembly 14, and the valve assembly 14 includes a valve body 141, a first valve sheet 142, and a second valve sheet 143.

The valve body 141 is provided at the second end 112 of the body 11 to close the second end 1012 of the cavity 101. The valve body 141 is provided with a first valve opening 1413 and a second valve opening 1414, both of which run through the valve body 141 and are communicated with the cavity 101.

Figure 9:
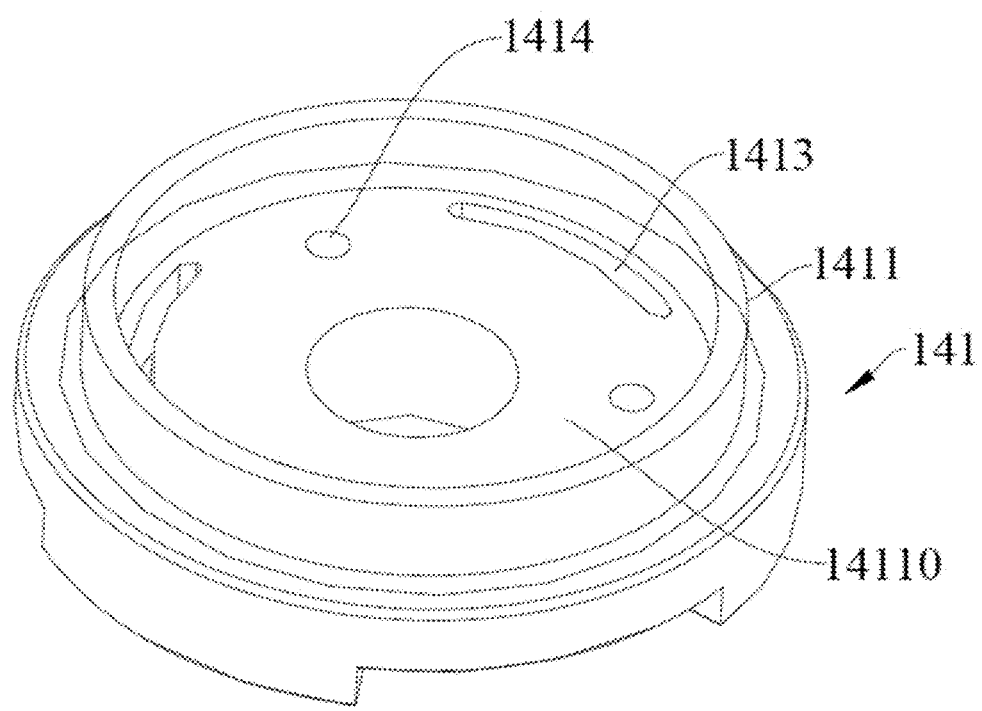
FIG. 9 is a schematic view of a valve body of an adjustment device according to embodiments of the present disclosure, in which a first end of the valve body is illustrated.
Figure 10:
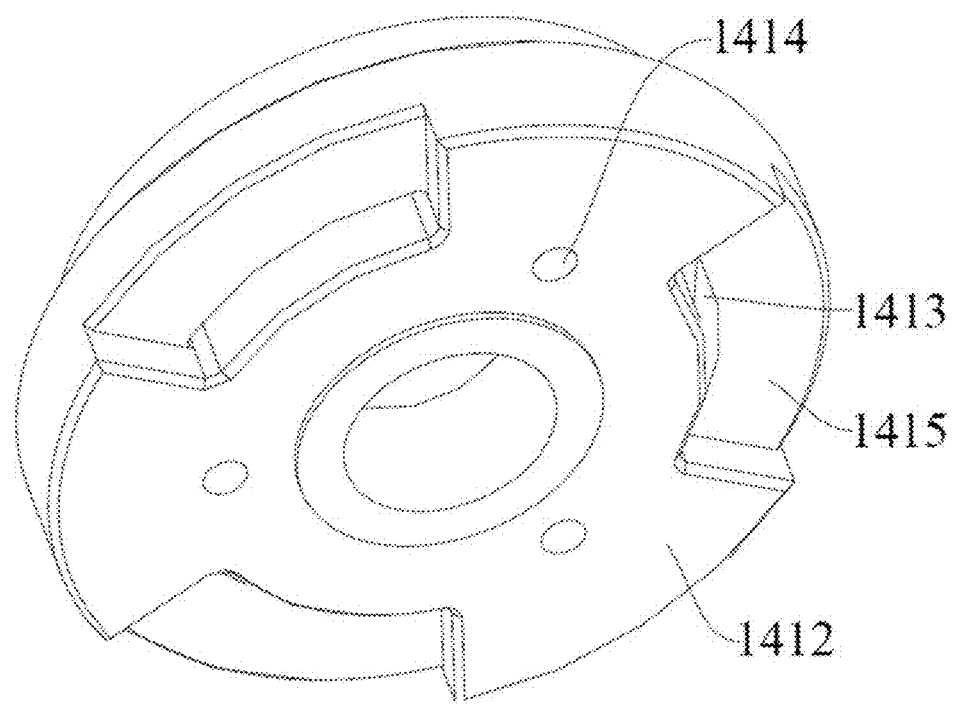
FIG. 10 is a schematic view of a valve body of an adjustment device according to embodiments of the present disclosure, in which a second end of the valve body is illustrated.

As illustrated in FIGS. 9 and 10, three first valve openings 1413 and three second valve openings 1414 are provided. The three first valve openings 1413 are arranged along a circumferential direction of the valve body 141 and spaced apart from each other. The three second valve openings 1414 are arranged along the circumferential direction of the valve body 141 and spaced apart from each other. The first valve openings 1413 and the second valve openings 1414 are alternately arranged one by one. Each of the first valve openings 1413 has an arc cross section, and each of the second valve openings 1414 has a circular cross section. A lower end face of the valve body 141 is further provided with three arc-shaped grooves 1415 spaced apart along the circumferential direction of the valve body 141, and the first valve opening 1413 has a lower end communicated with the arc-shaped groove 1415.

The first valve sheet 142 is provided at a first end 1411 of the valve body 141 (an upper end of the valve body 141 as shown in FIG. 2) and located in the cavity 101, and the first valve sheet 142 is configured to open or close the first valve opening 1413. As illustrated in FIG. 2, the first valve sheet 142 is arranged at the upper end of the valve body 141 and located in the cavity 101, and the first valve sheet 142 can open or close an upper end face of the first valve opening 1413. When the first valve sheet 142 opens the upper end face of the first valve opening 1413, the cavity 101 is communicated with the outside through the first valve opening 1413. When the first valve sheet 142 closes the upper end face of the first valve opening 1413, the cavity 101 is not in communication with the outside.

The second valve sheet 143 is provided at a second end 1412 of the valve body 141 (a lower end of the valve body 141 as shown in FIG. 2) and located outside the cavity 101, and the second valve sheet 143 is configured to open or close the second valve opening 1414. As illustrated in FIG. 2, the second valve sheet 143 is provided at the lower end of the valve body 141 and located outside the cavity 101, and the second valve sheet 143 can open or close a lower end face of the second valve opening 1414. When the second valve sheet 143 opens the lower end face of the second valve opening 1414, the cavity 101 is communicated with the outside through the second valve opening 1414. When the second valve sheet 143 closes the lower end face of the second valve opening 1414, the cavity 101 is not in communication with the outside.

In some specific embodiments, as illustrated in FIG. 2, the first valve sheet 142 is configured as an annular member, has a lower end face capable of closing the first valve opening 1413, and has an inner cavity opposite the second valve opening 1414. The second valve sheet 143 is configured as an annular member, has an upper end face capable of closing the second valve opening 1414, and is offset from the first valve opening 1413 in a radial direction of the body 11.

In some embodiments, the valve assembly 14 further includes a first elastic member 144, and the first elastic member 144 is located in the cavity 101 and configured to press the first valve sheet 142 onto a first end face 14110 of the valve body 141 to close the first valve opening 1413. As illustrated in FIG. 2, the first elastic member 144 is arranged in the cavity 101, the first elastic member 144 has an upper end in contact with a lower end face of a boss 113 and a lower end in contact with an upper end face of the first valve sheet 142, and the first elastic member 144 is in a compressed state, such that the first valve sheet 142 is pressed onto an upper end face of the valve body 141 by means of the first elastic member 144, thereby enabling the first valve sheet 142 to close the first valve opening 1413.

Figure 11:
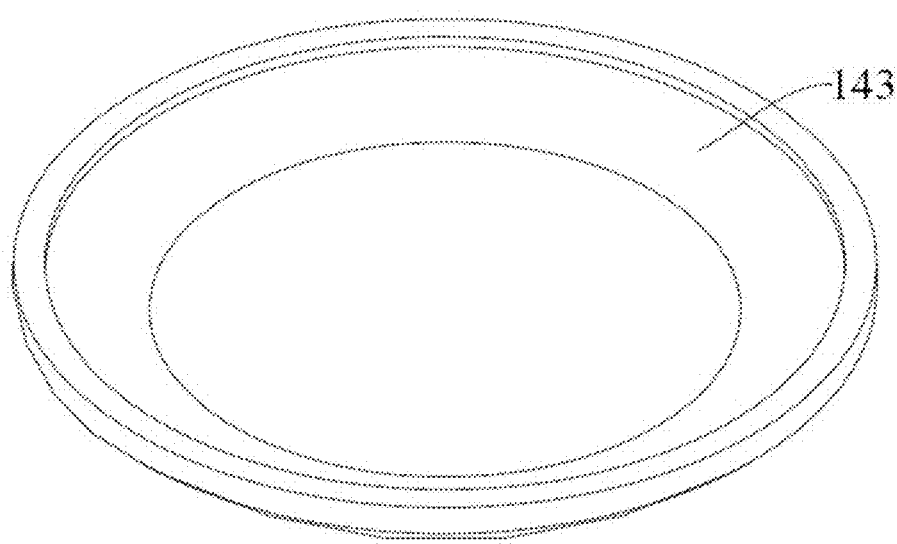
FIG. 11 is a schematic view of a second valve sheet of an adjustment device according to embodiments of the present disclosure.

In some embodiments, the second valve sheet 143 is configured as an annular member and has an inner diameter gradually increased along a direction away from the valve body 141 (i.e., an up-to-down direction shown in FIG. 2 and a down-to-up direction shown in FIG. 11). As illustrated in FIG. 2, the inner diameter of the second valve sheet 143 is gradually increased from up to down, and the upper end face of the second valve sheet 143 can close the second valve opening 1414.

The valve assembly 14 further includes a gasket 145 and a fastener 146, and the gasket 145 is located at a side of the second valve sheet 143 away from the valve body 141 (a lower end of the second valve sheet 143 as shown in FIG. 2) and abuts against an inner peripheral surface of the second valve sheet 143. As illustrated in FIG. 2, the gasket 145 is located at the lower end of the second valve sheet 143, and an outer peripheral surface of the gasket 145 abuts against the inner peripheral surface of the second valve sheet 143.

The fastener 146 connects the valve body 141 and the gasket 145 to position the second valve sheet 143 at the second end 1412 of the valve body 141. As illustrated in FIG. 2, the fastener 146 connects the valve body 141 and the gasket 145, and positions the second valve sheet 143 at the lower end of the valve body 141 by the gasket 145 abutting against the inner peripheral surface of the second valve sheet 143. It could be understood that one or a plurality of gaskets 145 can be provided, and the number of the gaskets 145 can be determined in the light of specific conditions.

In some embodiments, the fastener 146 is configured as a T-shaped bolt 1461 and a nut 1462. The bolt 1461 has a first end located in the cavity 101, and the first elastic member 144 is fitted over the first end of the bolt 1461 (an upper end of the bolt 1461 as shown in FIG. 2), such that the first elastic member 144 is positioned. The bolt 1461 has a second end (a lower end of the bolt 1461 as shown in FIG. 2) penetrating the first valve sheet 142, the valve body 141, the second valve sheet 143 and the gasket 145 and extending out of the cavity 101, and the nut 1462 is fitted with the second end of the bolt 1461, such that the valve body 141 and the gasket 145 are connected by the fitting between the bolt 1461 and the nut 1462.

In some embodiments, the body 11 includes a solid section 111 and a cylindrical section 112 connected to a second end of the solid section 111 (a lower end of the solid section 111 as shown in FIG. 3). The first hole 102 and the second hole 103 run through the solid section 111 along an axial direction of the body 11 (an up-and-down direction as shown in FIG. 3), and an inner cavity of the cylindrical section 112 is formed as the cavity 101. As illustrated in FIG. 3, the body 11 includes the solid section 111 and the cylindrical section 112 connected with each other, in which the solid section 111 exhibits a cylindrical shape and has an axial direction consistent with an axial direction of the cylindrical section 112.

In some embodiments, a second end face of the solid section 111 (a lower end face of the solid section 111 as shown in FIG. 2) is provided with the boss 113 extending into the cavity 101, the first hole 102 and the second hole 103 run through the boss 113, and an annular groove 105 is defined between an outer peripheral surface of the boss 113 and an inner peripheral surface of the cylindrical section 112. As illustrated in FIG. 3, the lower end face of the solid section 111 is provided with the boss 113 extending downwards and extending into the cavity 101, the first hole 102 and the second hole 103 run through the solid section 111 and the boss 113, and the annular groove 105 is defined between the outer peripheral surface of the boss 113 and the inner peripheral surface of the cylindrical section 112.

As illustrated in FIGS. 2 and 3, the adjustment inner gear ring 12 is fitted in the annular groove 105.

The second hole 103 includes a first hole segment 1031 and a second hole segment 1032. The first hole segment 1031 extends from a first end face of the solid section 111 (an upper end face of the solid section 111 as shown in FIG. 3) towards the boss 113. The second hole segment 1032 runs through the boss 113 and is communicated with the first hole segment 1031. The second hole segment 1032 has a larger cross-sectional area than the first hole segment 1031. A peripheral wall of the second hole segment 1032 has an opening portion 10320. The adjustment gear 133 is located in the second hole segment 1032 and meshes with the adjustment inner gear ring 12 through the opening portion 10320.

In some embodiments, the plurality of adjustment holes 120 are arranged in a half circle of the adjustment inner gear ring 12. In other words, the half circle of the adjustment inner gear ring 12 is provided with the adjustment holes 120.

Figure 5:
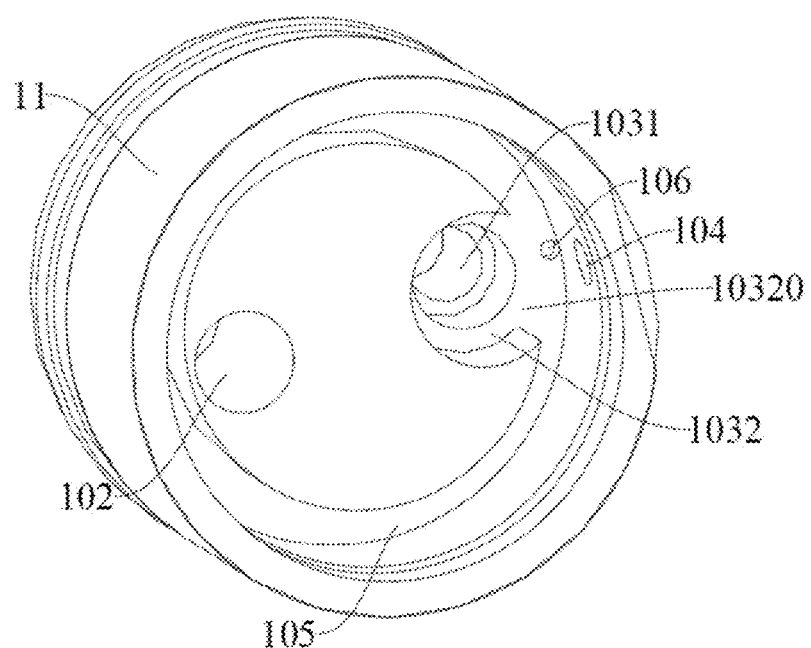
FIG. 5 is a schematic view of a body of an adjustment device according to embodiments of the present disclosure, in which a position of an opening portion is illustrated.
Figure 6:
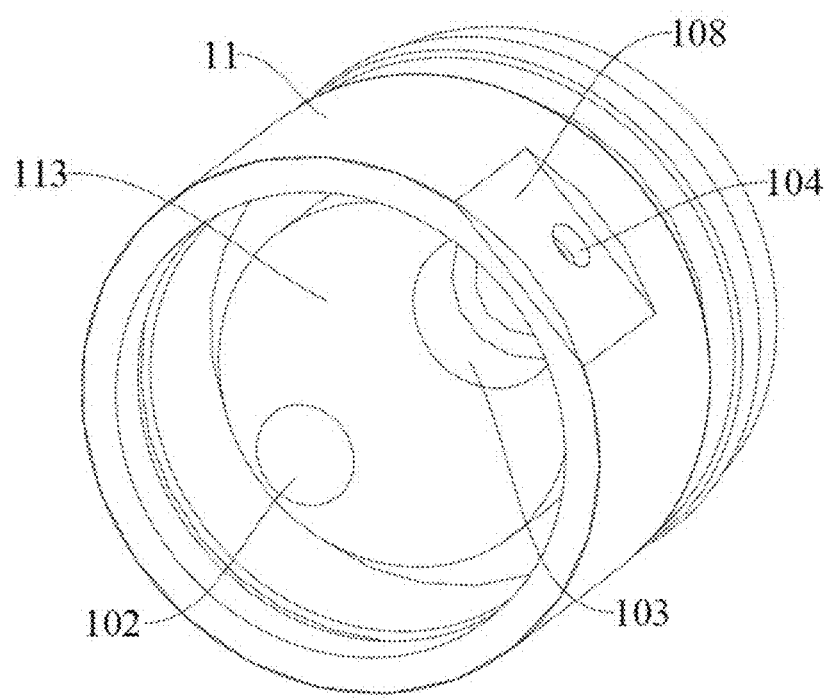
FIG. 6 is a schematic view of a body of an adjustment device according to embodiments of the present disclosure, in which a position of a recess is illustrated.

The adjustment device 1 further includes a limiting member 15 provided in the body 11. The adjustment inner gear ring 12 has an end face provided with a limiting guide slot 121 extending along the circumferential direction of the adjustment inner gear ring 12. The limiting member 15 is slidably fitted in the limiting guide slot 121. As illustrated in FIGS. 2, 5 and 7, the lower end face of the solid section 111 is provided with an orifice 106 extending downwards, an upper end face of the adjustment inner gear ring 12 is provided with the limiting guide slot 121, and the limiting guide slot 121 extends along the circumferential direction of the adjustment inner gear ring 12 and extends by the half circle of the adjustment inner gear ring 12. The limiting member 15 has an upper end provided in the orifice 106 and a lower end slidably fitted in the limiting guide slot 121. For the adjustment device 1 according to embodiments of the present disclosure, the rotation of the adjustment inner gear ring 12 can be limited to a range having the adjustment holes 120 by means of the limiting member 15 and the limiting guide slot 121, thereby improving the adjustment efficiency.

Figure 12:
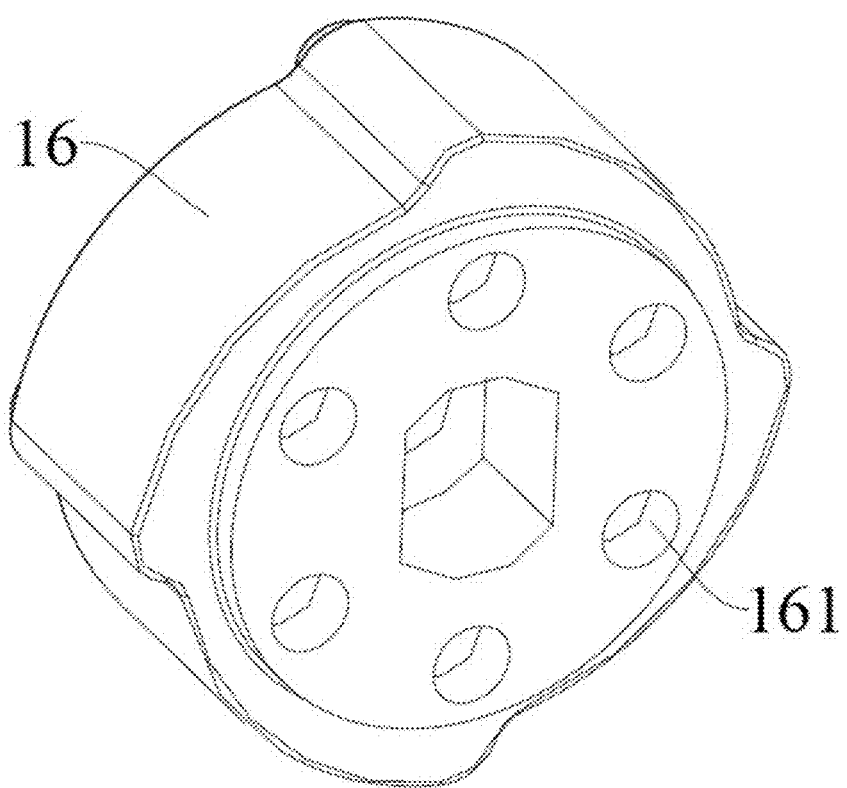
FIG. 12 is a schematic view of a knob of an adjustment device according to embodiments of the present disclosure.

In some embodiments, as illustrated in FIGS. 3 and 12, the adjustment device 1 further includes a knob 16 and a positioning assembly 17. The knob 16 is mounted on the first end 131 of the adjustment shaft 13 to drive the adjustment shaft 13 to rotate, and an end face of the knob 16 adjacent to the body 11 (a lower end face of the knob 16 as shown in FIG. 3) is provided with a plurality of positioning grooves 161 arranged along a circumferential direction of the knob 16 and spaced apart from each other.

The first end face 1110 of the body 11 is provided with a counter bore 107, and the positioning assembly 17 has a first end (an upper end of the positioning assembly 17 as shown in FIG. 3) arranged in the counter bore 107 and a second end (a lower end of the positioning assembly 17 as shown in FIG. 3) selectively fitted in one of the plurality of positioning grooves 161.

For the adjustment device 1 according to embodiments of the present disclosure, the adjustment shaft 13 can be driven to rotate by rotating the knob 16, such that the adjustment inner gear ring 12 is driven to rotate by means of the adjustment gear 133. By providing the plurality of positioning grooves 161 in the lower end face of the knob 16 and providing the positioning assembly 17 on the adjustment device 1, the knob 16 can be maintained in position when the knob 16 has been rotated by a certain degree to communicate one of the adjustment holes 120 with the third hole 104.

In some specific embodiments, the positioning assembly 17 includes a second elastic member 171 and a positioning ball 172. The second elastic member 171 is provided in the counter bore 107. The positioning ball 172 is provided at an end of the second elastic member 171 (an upper end of the second elastic member 171 as shown in FIG. 3), and the positioning ball 172 is selectively fitted in one of the plurality of positioning grooves 161.

In some embodiments, an outer peripheral surface of the body 11 is fitted with an inner peripheral surface of the first cylinder body 2 and is provided with a recess 108, and the third hole 104 is communicated with the first inner cavity 21 through the recess 108. Thus, a flow space of the oil entering the first inner cavity 21 through the third hole 104 is increased, so as to facilitate smooth flowing of the oil between the third hole 104 and the first inner cavity 21.

In some embodiments, when the oil flows from the second inner cavity 51 through the connecting pipe 4 into the first inner cavity 21, the first valve opening 1413 is closed, and the second valve opening 1414 is opened, such that part of the oil entering the cavity 101 through the first hole 102 enters the first inner cavity 21 through the second valve opening 1414, and another part of the oil entering the cavity 101 through the first hole 102 enters the first inner cavity 21 through the adjustment holes 120 and the third hole 104.

Figure 13:
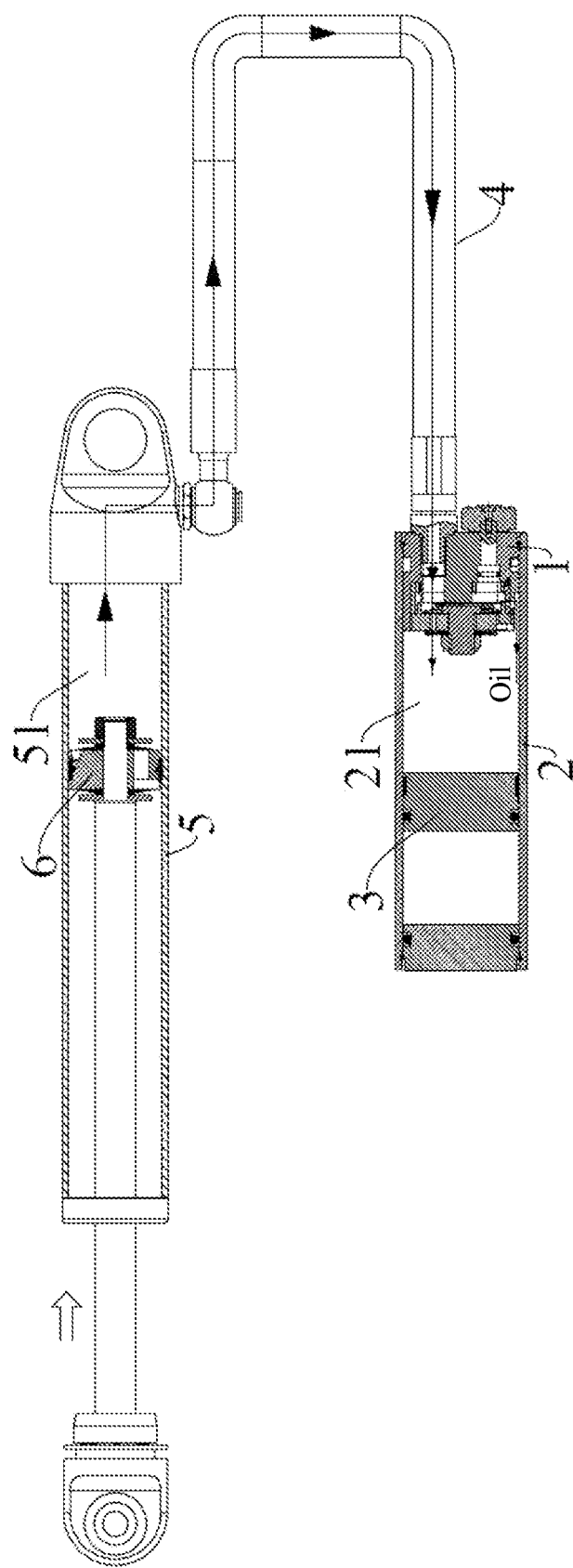
FIG. 13 is a schematic view of a shock absorber according to embodiments of the present disclosure, in which oil flows from a second inner cavity into a first inner cavity.

As illustrated in FIGS. 13, 14 and 2, when the oil flows into the first inner cavity 21 from the second inner cavity 51 via the connecting pipe 4, the oil enters the cavity 101 via the connecting pipe 4 and the first hole 102. Under the pressure of the oil in the cavity 101, the second valve sheet 143 opens the second valve opening 1414, and part of the oil in the cavity 101 enters the first inner cavity 21 through the second valve opening 1414, while another part of the oil entering the cavity 101 through the first hole 102 enters the first inner cavity 21 through the adjustment holes 120 and the third hole 104.

When the oil flows into the second inner cavity 51 from the first inner cavity 21 via the connecting pipe 4, the first valve opening 1413 is opened, and the second valve opening 1414 is closed, such that part of the oil in the first inner cavity 21 flows into the second inner cavity 51 through the first valve opening 1413, the cavity 101, the first hole 102, and the connecting pipe 4 sequentially, and another part of the oil in the first inner cavity 21 flows into the second inner cavity 51 through the third hole 104, the adjustment holes 120, the cavity 101, the first hole 102, and the connecting pipe 4 sequentially.

Figure 16:
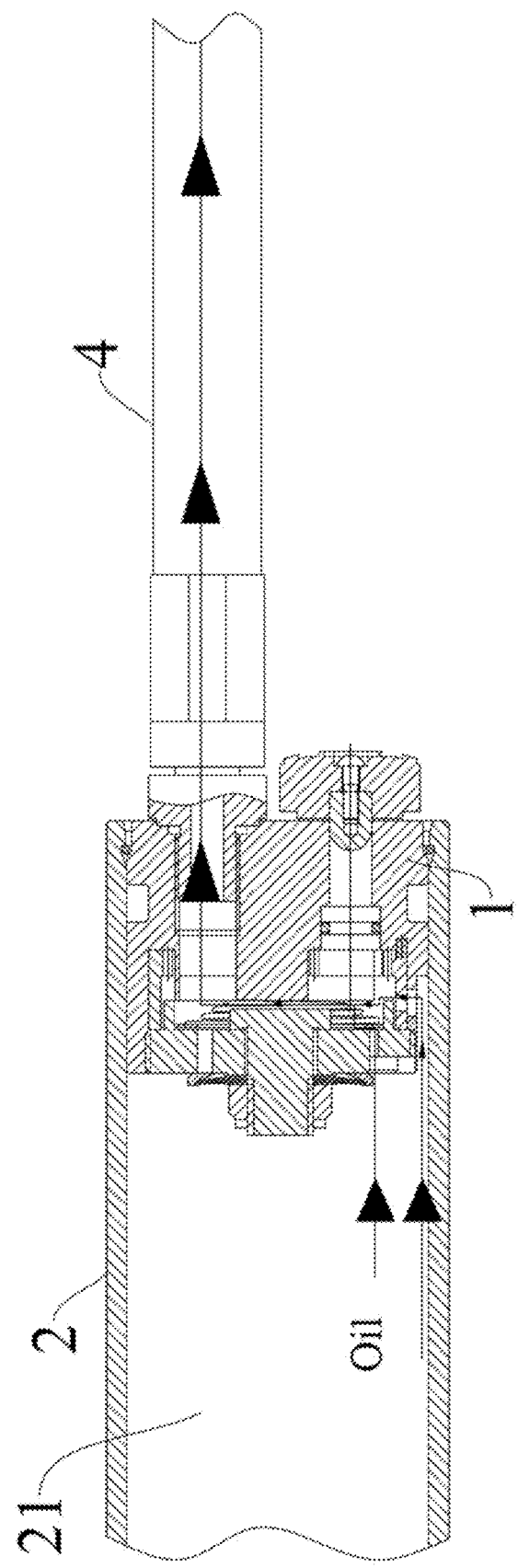
FIG. 16 is a partially enlarged view of FIG. 15.

As illustrated in FIGS. 15, 16 and 2, when the oil flows into the second inner cavity 51 from the first inner cavity 21 via the connecting pipe 4, under the pressure of the oil in the first inner cavity 21, the first valve sheet 142 opens the first valve opening 1413, such that part of the oil in the first inner cavity 21 flows into the second inner cavity 51 through the first valve opening 1413, the cavity 101, the first hole 102, and the connecting pipe 4 sequentially, and another part of the oil in the first inner cavity 21 flows into the second inner cavity 51 through the third hole 104, the adjustment holes 120, the cavity 101, the first hole 102, and the connecting pipe 4 sequentially.

In some embodiments, the first piston 3 divides the first inner cavity 21 into an inner cavity adjacent to a first end of the first cylinder body 2 (a right end of the first cylinder body 2 as shown in FIG. 13) and an inner cavity adjacent to a second end of the first cylinder body 2 (a left end of the first cylinder body 2 as shown in FIG. 13). The inner cavity adjacent to the second end of the first cylinder body 2 contains gas, while the inner cavity adjacent to the first end of the first cylinder body 2 can contain oil. In other words, as illustrated in FIG. 13, the first piston 3 divides the first inner cavity 21 into a right inner cavity which can contain oil and a left inner cavity which can contain gas.

In some embodiments, when the oil flows into the first inner cavity 21 from the second inner cavity 51, the oil in the second inner cavity 51 flows into the inner cavity adjacent to the first end of the first cylinder body 2 through the connecting pipe 4 and the adjustment device 1 sequentially to push the first piston 3 to move in a direction from the first end of the first cylinder body 2 toward the second end of the first cylinder body 2 (from right to left as shown in FIG. 13), so as to compress the gas. As illustrated in FIGS. 13 and 14, when the oil flows into the first inner cavity 21 from the second inner cavity 51, the oil in the second inner cavity 51 flows into the right inner cavity through the connecting pipe 4 and the adjustment device 1 sequentially to push the first piston 3 to move from right to left, so as to compress the gas.

When the oil flows into the second inner cavity 51 from the first inner cavity 21, the gas in the inner cavity adjacent to the second end of the first cylinder body 2 is released to push the first piston 3 to move in a direction from the second end of the first cylinder body 2 to the first end of the first cylinder body (from left to right as shown in FIG. 15), such that the oil flows into the second inner cavity 51 through the adjustment device 1 and the connecting pipe 4 sequentially. As illustrated in FIGS. 15 and 16, when the oil flows into the second inner cavity 51 from the first inner cavity 21, the gas in the left inner cavity is released to push the first piston 3 to move from left to right, such that the oil flows into the second inner cavity 51 through the adjustment device 1 and the connecting pipe 4 sequentially.

The first cylinder body 2, the first piston 3, and the adjustment device 1 in the shock absorber according to embodiments of the present disclosure constitute an adjustor according to embodiments of the present disclosure.

In some embodiments, when the oil flows into the first inner cavity 21 from the outside, the first valve opening 1413 is closed and the second valve opening 1414 is opened, such that part of the oil entering the cavity 101 through the first hole 102 enters the first inner cavity 21 through the second valve opening 1414, and another part of the oil entering the cavity 101 through the first hole 102 enters the first inner cavity 21 through the adjustment holes 120 and the third hole 104.

As illustrated in FIGS. 13, 14 and 2, when the oil flows into the first inner cavity 21 from the outside, the oil enters the cavity 101 via the connecting pipe 4 and the first hole 102. Under the pressure of the oil in the cavity 101, the second valve sheet 143 opens the second valve opening 1414, and part of the oil in the cavity 101 enters the first inner cavity 21 through the second valve opening 1414, while another part of the oil entering the cavity 101 through the first hole 102 enters the first inner cavity 21 through the adjustment holes 120 and the third hole 104.

When the oil flows to the outside from the first inner cavity 21, the first valve opening 1413 is opened, and the second valve opening 1414 is closed, such that part of the oil in the first inner cavity 21 flows to the outside through the first valve opening 1413, the cavity 101, the first hole 102, and the connecting pipe 4 sequentially, and another part of the oil in the first inner cavity 21 flows to the outside through the third hole 104, the adjustment holes 120, the cavity 101, the first hole 102, and the connecting pipe 4 sequentially.

As illustrated in FIGS. 15, 16 and 2, when the oil flows to the outside from the first inner cavity 21, under the pressure of the oil in the first inner cavity 21, the first valve sheet 142 opens the first valve opening 1413, such that part of the oil in the first inner cavity 21 flows to the outside through the first valve opening 1413, the cavity 101, and the first hole 102 sequentially, and another part of the oil in the first inner cavity 21 flows to the outside through the third hole 104, the adjustment holes 120, the cavity 101, and the first hole 102 sequentially.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Additionally, different embodiments or examples, as well as features in different embodiments or examples described in the present disclosure, can be combined by those skilled in the art without any contradiction.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or mutual communication; may also be direct connections or indirect connections via intervening structures; may also be inner communications of two elements or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Although embodiments have been shown and described, it would be appreciated by those skilled in the art that the above embodiments are explanatory and cannot be construed to limit the present disclosure, and changes, modifications, alternatives, and variations can be made in the above embodiments without departing from the scope of the present disclosure.

It is intended that the specification, together with the drawings, be considered exemplary only, where exemplary means an example. As used herein, the singular forms "a," "an," and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An adjustment device, comprising:
a body having a cavity therein, a first end comprising a first hole and a second hole, and a peripheral wall comprising a third hole, all of the first hole, the second hole, and the third hole being connected with the cavity;
an adjustment inner gear ring fitted in the cavity, and having a peripheral wall comprising a plurality of adjustment holes running through the peripheral wall, the plurality of adjustment holes being arranged along a circumferential direction of the adjustment inner gear ring and spaced apart from each other, and the plurality of adjustment holes having cross-sectional areas different from each other; and
an adjustment shaft having a first end and a second end, the second end of the adjustment shaft having an adjustment gear and passing through the second hole into the cavity, the adjustment gear meshing with the adjustment inner gear ring, and the adjustment shaft being rotatable to drive rotation of the adjustment inner gear ring by the adjustment gear so as to enable the third hole to be connected with the cavity through one of the plurality of adjustment holes.

2. The adjustment device according to claim 1, wherein the cavity further includes a second end, the second end of the cavity is open, the first hole extends from a first end face of the body towards a second end of the body by a first predetermined length, the second hole extends from the first end face of the body towards the second end of the body by a second predetermined length, and the first end of the adjustment shaft extends out of the second hole.

3. The adjustment device according to claim 2, further comprising a valve assembly, wherein the valve assembly comprises:
  a valve body provided at the second end of the body to close the second end of the cavity, and comprising a first valve opening and a second valve opening, both of the first valve opening and the second valve opening running through the valve body and being connected with the cavity;
  a first valve sheet provided at a first end of the valve body and located in the cavity, and configured to open or close the first valve opening; and
  a second valve sheet provided at a second end of the valve body and located outside the cavity, and configured to open or close the second valve opening.

4. The adjustment device according to claim 3, wherein the valve assembly further comprises a first elastic member located in the cavity and configured to press the first valve sheet onto a first end face of the valve body to close the first valve opening.

5. The adjustment device according to claim 4, wherein the second valve sheet is configured as an annular member and has an inner diameter gradually increased along a direction away from the valve body; the valve assembly further comprises a gasket and a fastener, the gasket is located at a side of the second valve sheet away from the valve body and abuts against an inner peripheral surface of the second valve sheet, and the fastener connects the valve body and the gasket to position the second valve sheet at the second end of the valve body.

6. The adjustment device according to claim 5, wherein the fastener is configured as a T-shaped bolt and a nut, the bolt has a first end located in the cavity, the first elastic member is fitted over the first end of the bolt to position the first elastic member, the bolt has a second end penetrating the first valve sheet, the valve body, the second valve sheet, and the gasket and extending out of the cavity, and the nut is fitted with the second end of the bolt.

7. The adjustment device according to claim 2, wherein the cross-sectional areas of the plurality of adjustment holes are gradually decreased along the circumferential direction of the adjustment inner gear ring.

8. The adjustment device according to claim 2, wherein the body comprises a recess in an outer peripheral surface thereof, and the third hole is connected with the recess.

9. The adjustment device according to claim 1, wherein the plurality of adjustment holes are arranged in a half circle of the adjustment inner gear ring; the adjustment device further comprises a limiting member in the body, the adjustment inner gear ring has an end face comprising a limiting guide slot extending along the circumferential direction of the adjustment inner gear ring, and the limiting member is slidably fitted in the limiting guide slot.

10. The adjustment device according to claim 1, further comprising:
  a knob mounted on the first end of the adjustment shaft to drive the adjustment shaft to rotate, an end face of the knob adjacent to the body comprising a plurality of positioning grooves arranged along a circumferential direction of the knob and spaced apart from each other; and
  a positioning assembly having a first end arranged in a counter bore in a first end face of the body, and a second end selectively fitted in one of the plurality of positioning grooves.

11. The adjustment device according to claim 10, wherein the positioning assembly comprises a second elastic member and a positioning ball, the second elastic member is in the counter bore, and the positioning ball is provided at an end of the second elastic member and selectively fitted in one of the plurality of positioning grooves.

12. The adjustment device according to claim 1, wherein the cross-sectional areas of the plurality of adjustment holes are gradually decreased along the circumferential direction of the adjustment inner gear ring.

13. The adjustment device according to claim 1, wherein the body comprises a recess in an outer peripheral surface thereof, and the third hole is connected with the recess.

14. The adjustment device according to claim 1, wherein the body comprises a solid section and a cylindrical section connected to a second end of the solid section, the first hole and the second hole run through the solid section along an axial direction of the body, and an inner cavity of the cylindrical section is formed as the cavity.

15. The adjustment device according to claim 14, wherein a second end face of the solid section comprises a boss extending into the cavity, the first hole and the second hole run through the boss, an annular groove is defined between an outer peripheral surface of the boss and an inner peripheral surface of the cylindrical section, and the adjustment inner gear ring is fitted in the annular groove; the second hole comprises a first hole segment extending from a first end face of the solid section towards the boss, and a second hole segment running through the boss and connected with the first hole segment, the second hole segment has a larger cross-sectional area than the first hole segment, the second hole segment has an opening portion in a peripheral wall thereof, and the adjustment gear is located in the second hole segment and meshes with the adjustment inner gear ring through the opening portion.

16. An adjustor, comprising:
  a first cylinder body having a first inner cavity;
  a first piston movably provided in the first inner cavity; and
  an adjustment device coupled to a first end of the first cylinder body,
  wherein the adjustment device, comprising:
    a body having a cavity therein, a first end comprising a first hole and a second hole, and a peripheral wall comprising a third hole, all of the first hole, the second hole, and the third hole being connected with the cavity,
    an adjustment inner gear ring fitted in the cavity, and having a peripheral wall comprising a plurality of adjustment holes running through the peripheral wall, the plurality of adjustment holes being arranged along a circumferential direction of the adjustment inner gear ring and spaced apart from each other, and the plurality of adjustment holes having cross-sectional areas different from each other, and an adjustment shaft having a first end and a second end, the second end of the adjustment shaft having an adjustment gear and passing through the second hole into the cavity, the adjustment gear meshing with the adjustment inner gear ring, and the adjustment shaft being rotatable to drive rotation of the adjustment inner gear ring by the adjustment gear so as to enable the third hole to be connected with the cavity through one of the plurality of adjustment holes.

17. A shock absorber, comprising:
a first cylinder body having a first inner cavity;
a first piston movably provided in the first inner cavity;
a second cylinder body having a second inner cavity;
a second piston movably provided in the second inner cavity;
an adjustment device; and
a connecting pipe connected with the second inner cavity, and connected with the first inner cavity by means of the adjustment device,
wherein the adjustment device, comprising:
   a body having a cavity therein, a first end comprising a first hole and a second hole, and a peripheral wall comprising a third hole, all of the first hole, the second hole, and the third hole being connected with the cavity,
   an adjustment inner gear ring fitted in the cavity, and having a peripheral wall comprising a plurality of adjustment holes running through the peripheral wall, the plurality of adjustment holes being arranged along a circumferential direction of the adjustment inner gear ring and spaced apart from each other, and the plurality of adjustment holes having cross-sectional areas different from each other, and
   an adjustment shaft having a first end and a second end, the second end of the adjustment shaft having an adjustment gear and passing through the second hole into the cavity, the adjustment gear meshing with the adjustment inner gear ring, and the adjustment shaft being rotatable to drive rotation of the adjustment inner gear ring by the adjustment gear so as to enable the third hole to be connected with the cavity through one of the plurality of adjustment holes.

18. The shock absorber according to claim 17, wherein an outer peripheral surface of the body is fitted with an inner peripheral surface of the first cylinder body and comprises a recess, and the third hole is connected with the first inner cavity through the recess.

19. The shock absorber according to claim 17, wherein the first piston divides the first inner cavity into an inner cavity adjacent to a first end of the first cylinder body and an inner cavity adjacent to a second end of the first cylinder body, wherein the inner cavity adjacent to the second end of the first cylinder body contains gas, while the inner cavity adjacent to the first end of the first cylinder body contains oil.

20. The shock absorber according to claim 19, wherein when the oil flows into the first inner cavity from the second inner cavity, the oil in the second inner cavity flows into the inner cavity adjacent to the first end of the first cylinder body through the connecting pipe and the adjustment device sequentially, to push the first piston to move in a direction from the first end of the first cylinder body toward the second end of the first cylinder body, so as to compress the gas;
   when the oil flows into the second inner cavity from the first inner cavity, the gas in the inner cavity adjacent to the second end of the first cylinder body is released to push the first piston to move in a direction from the second end of the first cylinder body to the first end of the first cylinder body, such that the oil flows into the second inner cavity through the adjustment device and the connecting pipe sequentially.

* * * * *